(12) United States Patent
Blumenfeld

(10) Patent No.: US 9,740,371 B2
(45) Date of Patent: *Aug. 22, 2017

(54) PANORAMIC EXPERIENCE SYSTEM AND METHOD

(71) Applicant: Turner Broadcasting System, Inc., Atlanta, GA (US)

(72) Inventor: Steven M. Blumenfeld, Lafayette, CA (US)

(73) Assignee: Turner Broadcasting System, Inc., Birmingham, AL (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/570,192

(22) Filed: Dec. 15, 2014

(65) Prior Publication Data

US 2015/0169148 A1    Jun. 18, 2015

Related U.S. Application Data

(63) Continuation of application No. 13/459,649, filed on Apr. 30, 2012, now Pat. No. 8,913,143, which is a continuation of application No. 12/728,986, filed on Mar. 22, 2010, now Pat. No. 8,169,492, which is a continuation of application No. 10/748,123, filed on Dec. 31, 2003, now Pat. No. 7,683,937.

(51) Int. Cl.
| | |
|---|---|
| *G06F 3/0482* | (2013.01) |
| *H04N 5/232* | (2006.01) |
| *H04N 7/18* | (2006.01) |
| *G06F 3/0484* | (2013.01) |

(52) U.S. Cl.
CPC ........ *G06F 3/0482* (2013.01); *G06F 3/04842* (2013.01); *H04N 5/23203* (2013.01); *H04N 7/181* (2013.01); *H04N 7/185* (2013.01)

(58) Field of Classification Search
CPC ........... H04N 5/23203; H04N 5/23225; H04N 7/181; H04N 7/185; G06F 3/0482; G06F 3/04842
See application file for complete search history.

(56) References Cited

U.S. PATENT DOCUMENTS

| | | | |
|---|---|---|---|
| 4,566,036 | A | 1/1986 | Kadosawa |
| 5,495,576 | A | 2/1996 | Ritchey |
| 5,598,208 | A | 1/1997 | McClintock |
| 5,745,126 | A | 4/1998 | Jain |
| 5,850,352 | A | 12/1998 | Moezzi |
| 6,002,995 | A | 12/1999 | Suzuki |
| 6,208,379 | B1 | 3/2001 | Oya |
| 6,359,647 | B1 | 3/2002 | Sengupta |
| 6,680,746 | B2 | 1/2004 | Kawai |

(Continued)

*Primary Examiner* — Tuan Ho
(74) *Attorney, Agent, or Firm* — Fish & Richardson P.C.

(57) ABSTRACT

In one general sense, a user may be presented with a multimedia experience corresponding to an entertainment event or venue by managing a sensor array having at least two sensors that are made configured to provide a stream of data units, associating location information with sensors in the sensor array, enabling the user to perceive a map related to an entertainment event or venue, relating the perceived map to one or more sensors within the sensor array, receiving a user request identifying a selected position within the map, identifying one or more sensors within the sensor array corresponding to the selection, and presenting to the user a multimedia experience based on one or more streams of data units associated with the selected sensors.

20 Claims, 13 Drawing Sheets

(56) References Cited

U.S. PATENT DOCUMENTS

| | | |
|---|---|---|
| 6,697,105 B1 | 2/2004 | Kato |
| 6,891,566 B2 | 5/2005 | Marchese |
| 6,919,921 B1 | 7/2005 | Morota |
| 6,954,224 B1 | 10/2005 | Okada |
| 7,015,954 B1 | 3/2006 | Foote |
| 7,106,364 B1 | 9/2006 | Noro |
| 7,131,136 B2 | 10/2006 | Monroe |
| 7,187,402 B2 | 3/2007 | Yonezawa |
| 7,199,817 B2 | 4/2007 | Mottur |
| 7,321,387 B2 | 1/2008 | Novais |
| 7,683,937 B1 | 3/2010 | Blumenfeld |
| 2002/0047895 A1 | 4/2002 | Bernardo |
| 2002/0138847 A1 | 9/2002 | Abrams |
| 2004/0064838 A1 | 4/2004 | Olesen |
| 2005/0093976 A1 | 5/2005 | Valleriano |
| 2013/0329047 A1 | 12/2013 | Jankowski |

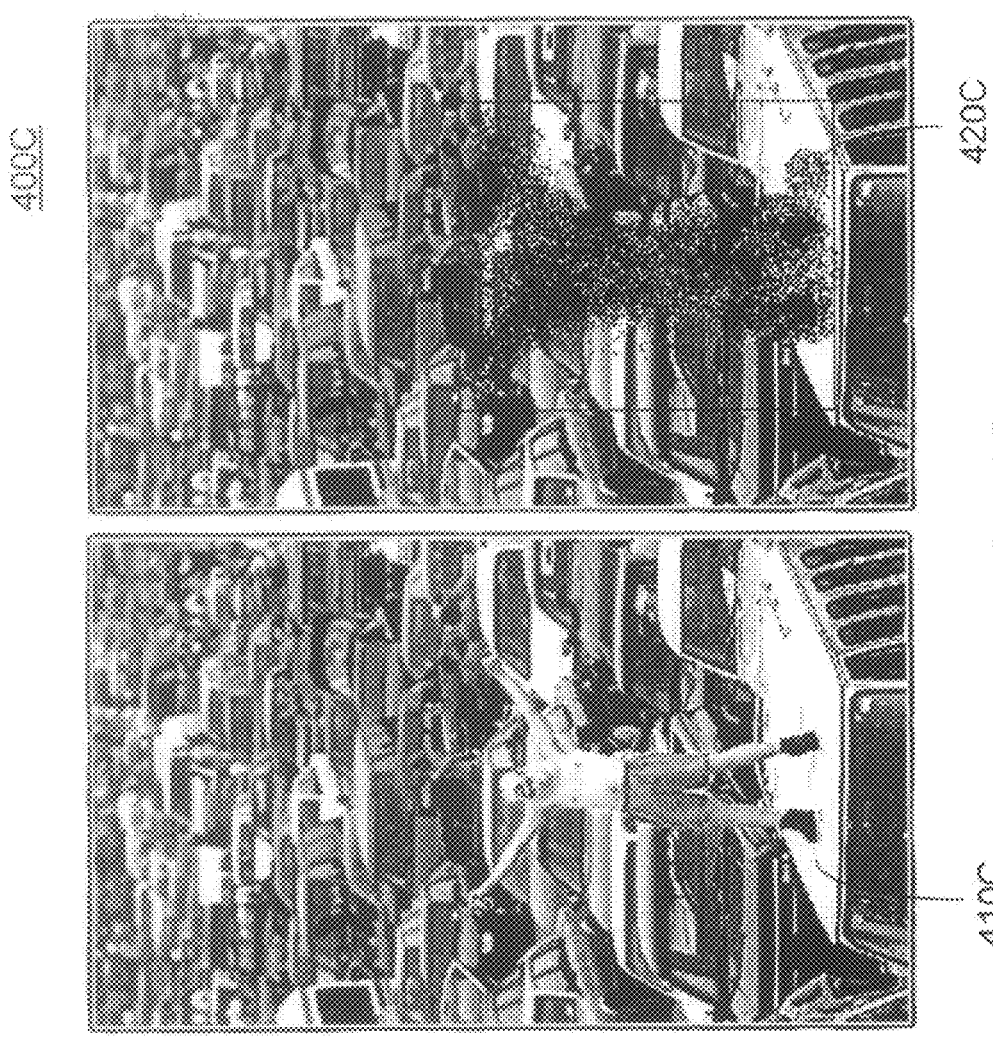

PANORAMIC EXPERIENCE SYSTEM AND METHOD

CROSS REFERENCE TO RELATED APPLICATIONS

This application is a continuation of U.S. application Ser. No. 13/459,649, filed Apr. 30, 2012, and titled PANORAMIC EXPERIENCE SYSTEM AND METHOD, which is a continuation of U.S. application Ser. No. 12/728,986, filed Mar. 22, 2011, now U.S. Pat. No. 8,169,492, issued May 1, 2012, and titled PANORAMIC EXPERIENCE SYSTEM AND METHOD, which is a continuation of U.S. application Ser. No. 10/748,123, filed Dec. 31, 2004, now U.S. Pat. No. 7,683,937, issued Mar. 23, 2010 and titled PANORAMIC EXPERIENCE SYSTEM AND METHOD. The above references applications are incorporated herein by reference in their entireties.

TECHNICAL FIELD

This document relates to managing multiple sensors.

BACKGROUND

Sensors may provide rich media content. Examples of sensors providing rich media content are included in camera systems and microphone systems, where the camera systems are used to capture video and/or imagery data and microphone systems are used to capture audio information.

SUMMARY

In one general sense, a user may be presented with a multimedia experience corresponding to an entertainment event or venue by managing a sensor array having at least two sensors that are made configured to provide a stream of data units, associating location information with sensors in the sensor array, enabling the user to perceive a map related to an entertainment event or venue, relating the perceived map to one or more sensors within the sensor array, receiving a user request identifying a selected position within the map, identifying one or more sensors within the sensor array corresponding to the selection, and presenting to the user a multimedia experience based on one or more streams of data units associated with the selected sensors.

Implementations may include one or more of the following features. For example, identifying more than one sensor in the sensor array and presenting to the user the multimedia experience may include providing a multimedia experience based on streams of data received from each of the identified sensors. Managing the sensor array and associating location information may include operating multiple camera systems where the camera systems include a video capture system and a location provider system. Operating the multiple camera systems may include determining location information using at least one of a Global Positioning system receiver, a gyroscope, and a local beacon.

Operating the multiple camera systems may include operating two or more systems that provide video. Managing the sensor array and associating location information may include operating multiple microphone systems, where the microphone systems may include a sound capture system and a location provider system.

Operating the multiple microphone systems may include determining location information using at least one of a Global Positioning system receiver, a gyroscope, and a local beacon. Managing the sensor array may include managing more than one type of sensor. Associating location information may include determining a location for a sensor relative to an architectural structure.

Determining the location for the sensor relative to the architectural structure may include determining the location for the sensor in an entertainment venue.

The location for the sensor in the entertainment venue may be used to determine metadata descriptive of the entertainment experience.

Enabling the user to perceive and relating the perceived map may include using metadata to describe the user experience associated with the sensor. Enabling the user to perceive and relating the perceived map may include generating a web page enabling the user to navigate among the sensors the sensor array and select the selected sensor in the sensor array.

A permission level for the user may be determined. Determining the permission level may include determining a level of access to which the user has subscribed. Determining the permission level may include identifying sensors that are accessible and inaccessible to the user, and regulating access by the user appropriately. Managing the sensor array, associating location information, enabling the user to perceive the map, relating the perceived map to the sensors within the sensor array, receiving the user request, identifying the sensors, and presenting to the user the multimedia experience may include determining whether a stream of data units is available from a better-matching sensor that better matches a user's perceived interest and notifying the user about the availability of the better matching sensor.

Notifying the user about the availability may include enabling the user to receive to the stream of data units from the better matching sensor. Notifying the user about the availability may include enabling the user to upgrade a permission level so that the user may receive a premium feed. The permission level may be determined to support access before enabling access the selected stream of data units.

Presenting to the user the multimedia experience may include combining the stream of data units with other streams of data units from other sensors in the sensor array into a combined stream and enabling the client to access the combined stream. Combining the stream of data units may include presenting a three dimensional presentation. Combining the stream of data units may include enabling presentation of a simulated view from a location where no sensor is located.

Presenting to the user the multimedia experience may include performing intermediary processing on the selected stream of data units to generate an edited stream of data units and enabling the client to access the edited stream.

DESCRIPTION OF DRAWINGS

FIG. 4C is an exemplary user interface that may be used to shelter a child from inappropriate content or showing available sensors for a nonpremium user.

DETAILED DESCRIPTION

Figure 1:
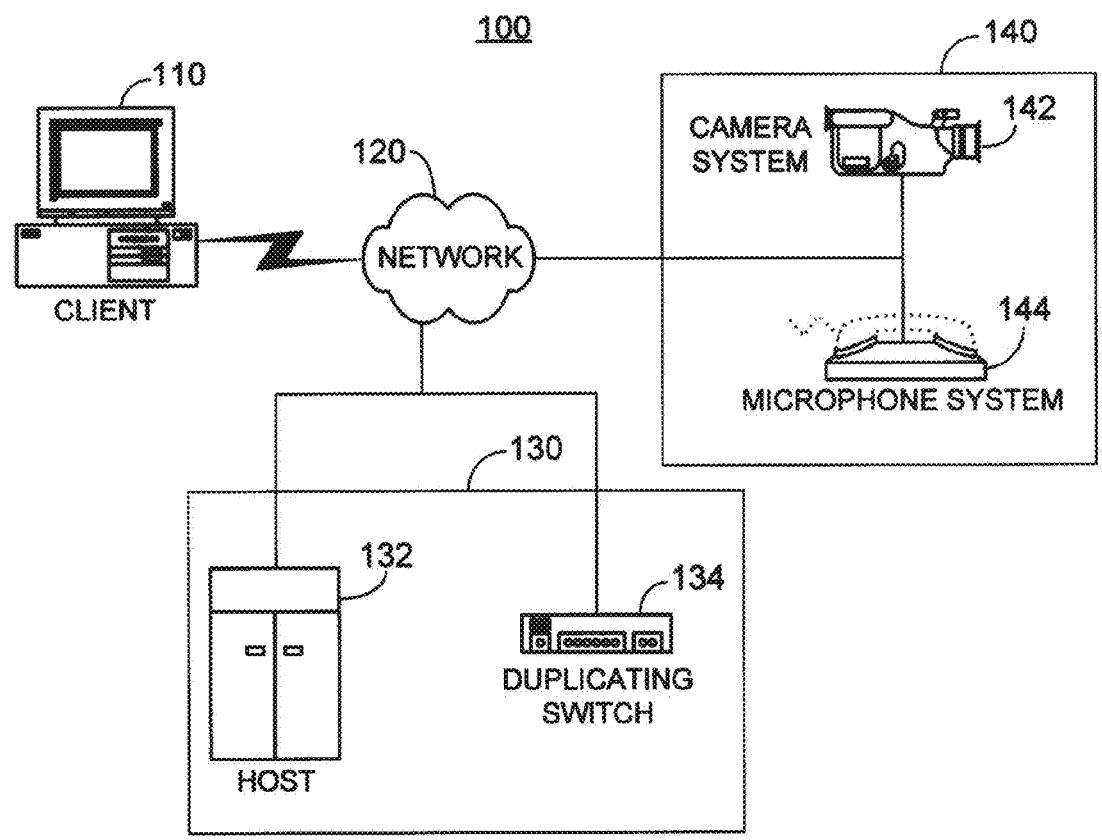
FIG. 1 is a block diagram of an exemplary communications network enabling a client to participate in an entertainment experience.

Communications networks, such as the Internet, enable the widespread distribution of digital content, such as rich media content (e.g., audio, video, and imagery) which may be gathered using sensors communicatively coupled with a communications network over which the digital content may be routed or shared. A sensor, such as a camera system, may be configured to transmit a stream of data units representing video information to a distribution system, for example, a host server or a duplicating switch in a data center. Clients may be configured to interface with the distribution system to access content gathered by the sensor.

A sensor array is used to present multiple sources of digital content. For example, a site, a facility, or an event may be saturated by multiple sensors in a uniform or nonuniform sensor array. Sensors within the sensor array generally use a wired or wireless network to interface with a distribution system in the data center (e.g., through a fixed network gateway), which in turn, makes the digital content from sensors available. More particularly, the distribution system in the data center devices may enable clients to intelligently navigate among sensors within the sensor array and to present content from one or more sensors within the sensor array, independently or in a simulated manner.

Furthermore, using the sensor array, an entertainment provider enables a user to remotely participate in an entertainment experience. The entertainment provider uses a sensor array with multiple sensors deployed throughout an entertainment venue. The sensor array may be managed so that one or more of the sensors may provide a stream of data units that is made available for distribution. The location of the sensors may be provided with the sensor data to generate a display data set used to generate a display for a user. The user may select one or more of the sensors in the sensor array to access the selected stream of data units associated with the selected sensor.

To illustrate, a service provider may distribute a number of mobile camera systems throughout a concert site. Some of these camera systems may include stationary cameras that provide a video feed from a fixed location in the concert site. The service provider also distributes portable systems. For example, the service provider may equip concertgoers with helmet-mounted camera systems, or leverage information obtained through concert goers, mobile telephones, or PDAs. The helmet-mounted camera systems may include a GPS receiver and a wireless communications interface enabling the helmet-mounted camera system to use the wireless communications interface to share camera data and enable access to what the concertgoer perceives, along with the location of the concertgoer. A host manages the sensor array of helmet-mounted cameras and fixed cameras so that a user may view a display on a client indicating the different camera systems that are available to provide the concert experience. For example, the user may view a web page that displays a map of the concert site and superimposes graphical representations of the different camera systems over the map. The display enables the user select one of the cameras, and access the stream of data units associated with the selected sensor. Thus, a user may experience the concert from a helmet-mounted camera system on a first concertgoer in the middle of the crowd. As the first concertgoer moves around the concert site, the user may receive the video stream of the first concertgoer moving around the concert site. The user may decide to switch to a helmet-mounted camera system mounted on a second concertgoer located in the front row, or on another camera system (not necessarily helmet mounted) located on a performer on stage.

There may be different levels of access and filtering involved. For example, the user may enroll in a premium access system allowing the user to access streams of data units from camera-systems for backstage content. This may allow the user to virtually attend an interview between an entertainer and a journalist. Similarly, access to a camera system may be interrupted if the camera system is transmitting inappropriate content to the user. For instance, a supervisor with a delay, interrupt, or blur control may monitor the content and use the control to interrupt the presentation of content in the event that inappropriate content is being transmitted. Alternatively, a stream of content may be analyzed by a computer recognition system to recognize and filter out inappropriate audio content. Thus, if one of the performers on stage performs an inappropriate song or behaves in a manner inappropriate for a younger audience, the host may interrupt the stream with the inappropriate content and switch to another camera or audio signal to preclude the inappropriate action. In one instance, the stream transmitted to a user may switch to a video feed of a commentator offering their commentary during a portion of a song deemed likely to be offensive. The interruption need not be complete. For example, the vocal frequencies or video feed may be transformed by a "blur" function to preclude perception of offensive material while preserving the flow of content.

Thus, an entertainment provider may use the sensors to provide a new entertainment experience, by virtue of offering to users a map interface by which they effect selection of sensors within the array relative to a location or by virtue of offering users an ability to simulate a multimedia experience at a selected position through the amalgamation of sensor data derived from two or more sensors located proximate to the selected position. An entertainment provider providing such a new entertainment experience may attract additional interest and increased participation as users explore the new entertainment experience. Ideally, a user is provided with a different experience each time a user participates in the entertainment experience. This different experience may be realized by providing a user with options and/or some degree of control in the entertainment experience. Similarly, the technology may enable a user to interface with entertainers in a manner not previously possible.

FIG. 1 is a block diagram of an exemplary communications system 100 enabling a client 110 to participate in an entertainment experience by interfacing with a distribution system 130 and a venue system 140.

The client 110 typically includes a computing device enabling a user to exchange information over a communications network. The client 110 may include one or more devices capable of accessing content residing on the distribution system 130. The client 110 may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a micro-browser application on a reduced operating system with general purpose and specialized hardware capable of operating in mobile environments.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 typically includes hardware and/or software capable of enabling direct or indirect communications between the client 110 and other devices in the communications system 100. As such, the network 120 may include a direct link between the client 110 and the other devices, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The distribution system 130 generally includes one or more devices configured to receive digital content (e.g., streams of data units) from a venue system 140 for distribution to one or more clients 110. The distribution system 130 includes a communications interface to receive the digital content from the venue system 140. The distribution system 130 is then configured to process the digital content and enable a client 110 to access the digital content. In one implementation, the distribution system 130 also includes a management system (not shown) configured to manage one or more venue system 140 and/or the digital content provided by the venue system 140. For example, the management system may transmit configuration instructions to sensors in the venue system 140 so that a sensor in the venue system 140 uses a particular configuration or profile, or captures a particular subject. In another example, the management system processes a stream of data units provided by a sensor so that multiple clients 110 may access a stream of interest. Yet another example may feature a management system configured to generate display data enabling a client 110 to view one or more locations in the sensor array.

The distribution system 130 may include a general-purpose computer having a central processor unit (CPU), and memory/storage devices that store data and various programs such as an operating system and one or more application programs. Other examples of a distribution system 130 includes a workstation, a server, a special purpose device or component, a broadcast system, other equipment, or some combination thereof capable of responding to and executing instructions in a defined manner. The distribution system 130 also may include an input/output (I/O) device (e.g., video and audio input and conversion capability), and peripheral equipment such as a communications card or device (e.g., a modem or a network adapter) for exchanging data with the network 120.

The distribution system 130 is generally capable of executing instructions under the command of a controller (not shown). The distribution system 130 may be used to provide content to the client 110. The controller may be implemented by a software application loaded on the distribution system 130 for commanding and directing communications exchanged with the client 110. Other examples of the controller include a program, a piece of code, an instruction, a device, a computer, a computer system, or a combination thereof, for independently or collectively instructing the client 110 or the distribution system 130 to interact and operate as described. The distribution system 130 may be embodied permanently or temporarily in any type of machine, component, physical or virtual equipment, storage medium, or propagated signal capable of providing instructions to the distribution system 130.

The host 132 may include a system configured to assist the client 110 in managing access to the network and the venue system 140. In one example, the host 132 is used to perform one or more operations or calculations that enable the client 110 to access a stream of interest. For example, the host 132 may be configured to present a graphical user interface through a web browser so that a user may navigate amongst the sensors in the venue system 140. In another example, the host 132 is used to generate a composite data signal from multiple sensors in the venue system 140 to generate multi channel sound and/or video.

The distribution system 130 may include a duplicating switch 134. Generally, a duplicating switch 134 includes a device that performs network operations and functions in hardware (e.g., in a chip or part of chip). In some implementations, the duplicating switch 134 may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP (Internet Protocol) address of the received packet, and filtering based on the IP address by implementing a logical gate structure in silicon.

Implementations of the device included in the duplicating switch 134 may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch 134 also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which clients are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The venue system 140 includes one or more sensors and computing devices configured to provide sensor data to a distribution system 130. For example, the venue system 140 may include a sensor array of cameras and microphones distributed throughout venue. The sensor array may include a wireless LAN that receives digital content from the sensor array. The wireless sensor then may be coupled to a venue infrastructure that packages and transmits the digital content to the distribution center 130.

The venue system 140 may use one or more location devices. For example, the venue system 140 may use a GPS system, a wireless beacon and/or gyroscopes that provide location information related to digital content or a device in the venue. Thus, a stream of content from a device in the venue system 140 may be accompanied by metadata indicating the location of the particular device. In one implementation, the location is provided in absolute coordinates (e.g., a particular latitude/longitude pair). In another implementation, the location is provided relative to other systems, structures, and/or devices. For instance, the location may be provided relative to a local beacon, other devices (e.g., cameras) in the venue system 140, and/or fixed reference in a structure (e.g., a corner of the building). The location information may be packaged in metadata that is transmitted in or associated with the stream of data units from the sensor. The metadata then may be parsed to enable a user to perceive a map related to the event or venue.

The venue system may include a directional component. In some instances, a user may be more interested in the subject of a venue system (e.g., what the image is capturing) than the location of the image. Accordingly, the venue system may also present location information related to the subject of the venue sensor. In one implementation, a sensor may include directional information and a range for the subject (e.g., an optical or sonar sensor that provides range information for an autofocus system in a camera). The directional information and the range also may indicate the depth and breadth of the subject being captured. This may include a camera indicating metadata that describes the boundaries of the subject. This also may include using a host that devices the boundaries from the range information and knowing the type of camera.

The directional information for a sensor may be filtered or operated on to enable better selection of a sensor capturing the image of interest. For example, in a concert venue, a service provider may determine that most users would like to view the stage absent instructions from the user to the contrary. Accordingly, the host may filter the presentation of sensor systems so that only the sensors capturing the stage may be selected. If a sensor system no longer captures the stage, the host may switch to a camera that is capturing the stage. A user may override the service provider configuration and elect to stay with a particular sensor that may not be focused on the stage, or allow a user to monitor the audience.

The metadata may include time and/or location information. By associating metadata with a time/location reference, a production system may generate a search or retrieve content using time or location parameters. Thus, providing a simulated view or simulating walking through a crowd may be performed by searching the metadata for a particular location and/or time, or finding the 'closest' data by referencing the metadata values to ascertain the data that most closely matches the desired position or time. For example, while using a camera at a first location would be ideal to present a desired image, using a camera at a second location that is the 'closest' to the first location may provide the requisite experience when the first location is unavailable. The sensor data may be stored and the metadata may be structured so as to enable quick manipulation metadata (to find the next sensor) and quick retrieval of content (so as to present a less jittery content). Thus, the metadata may be labeled in such a manner as to indicate a location and time relative to other metadata.

The directional information also may include using location information for the front and back of a sensor. The location of the front and back of the sensor may be used to generate a vector that describes the subject. Similarly, a GPS receiver may be used that provides directional information (and also speed).

The camera system 142 includes a device configured to provide video or images. The microphone system 144 may include a device configured to provide audio information.

In some implementations, the camera system 142 and the microphone system 144 may include a location system and/or a communications interface. The communications interface may include a fixed communications interface (e.g., such as a USB (Universal Serial Bus) interface, a coaxial cable connector for transmitting a video signal, and/or a FireWire port. The communications interface may include a wireless network interfaces such as an 802.11 (a), (b), or (g) interface.

The camera system 142 and the microphone system 144 may be configured to provide location information as the sensor (e.g., audio and video) information is being provided.

A user may be allowed to select a path of sensors to generate a display with the appearance of 'moving' through a venue. For example, a user virtually participating in a concert may access a video feed associated with a particular location. The user then may elect to simulate walking through a crowd by incrementally presenting camera images from the a neighboring, perhaps even the closest, camera in the direction of the determined path, which is then replaced by content from another camera along the path.

A client display may be dynamically updated to reflect the updated positions of sensors. Alternatively, a camera may represent a locus of cameras for a particular region or location. If an existing camera changes so that the camera is no longer providing content representative of the location, content from another camera that may provide representative data for the location may be selected for distribution and access. Thus, an icon for a location may be preserved, even if use of the particular camera varies.

The sensor system may be coupled to a messaging infrastructure so that a user may exchange messages with a sensor operator. For example, a user may be allowed to send instant messages to a camera operator so that the user may exchange suggestions with the camera operator.

Wireless phones and PDAs may be used as sensors. For example, a wireless phone may include a camera that allows video and images to be transmitted. Similarly, networked video cameras may be used to present the images.

Also, sensors of different types may be used. For example, the types of sensors may include microphones, digital photographic cameras, various forms of sensors (e.g., temperature), and various forms of video cameras (e.g., different resolutions and frame rates, HDTV cameras). The different forms of sensors may relate to a different permission/subscription level. For example, an entry-level subscription may allow low bit rate video cameras to be accessed while a premium subscription may allow HDTV cameras and multichannel audio to be accessed.

The panoramic experience may be presented by a production system, a parsing system, and a client presentation system. The production system may be used by a studio (e.g., produced by a film, news, or entertainment organization) to capture data from a variety of sensors. The parsing system may be used to process and package one or more sensor streams so that the sensor information may be manipulated as required. For example, the parsing system may be configured to receive a stream, determine location information with a stream, and generate metadata for a stream related to the stream or location. The client presentation system may include a system configured to package the streams so that they may be presented to the client. This may be done by analyzing the metadata, and generating a display through using the metadata.

Figure 2A:
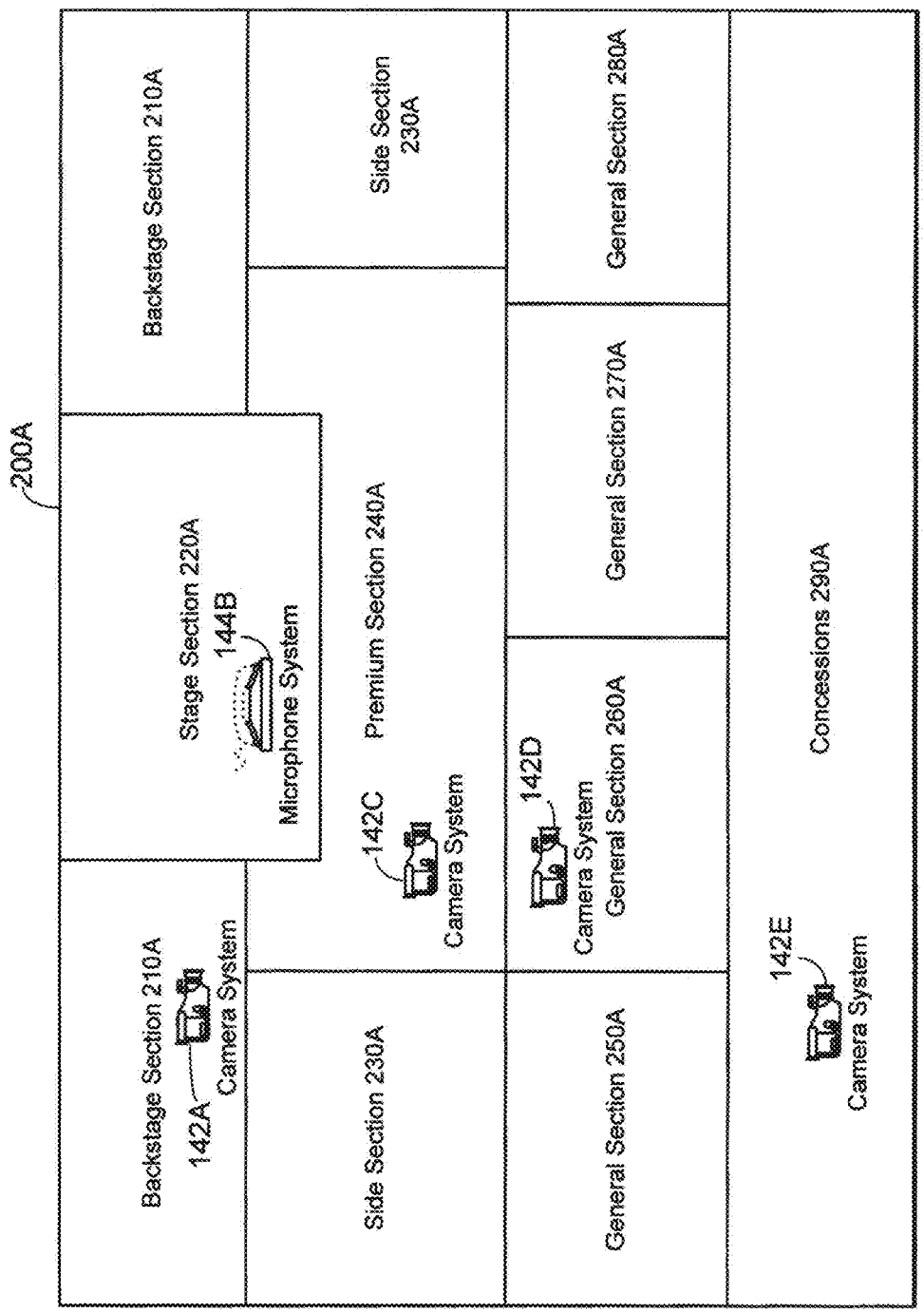
FIG. 2A is a block diagram of an exemplary venue topology illustrating how an entertainment venue (e.g., a concert site) may be configured to support a panoramic entertainment experience.
Figure 2B:
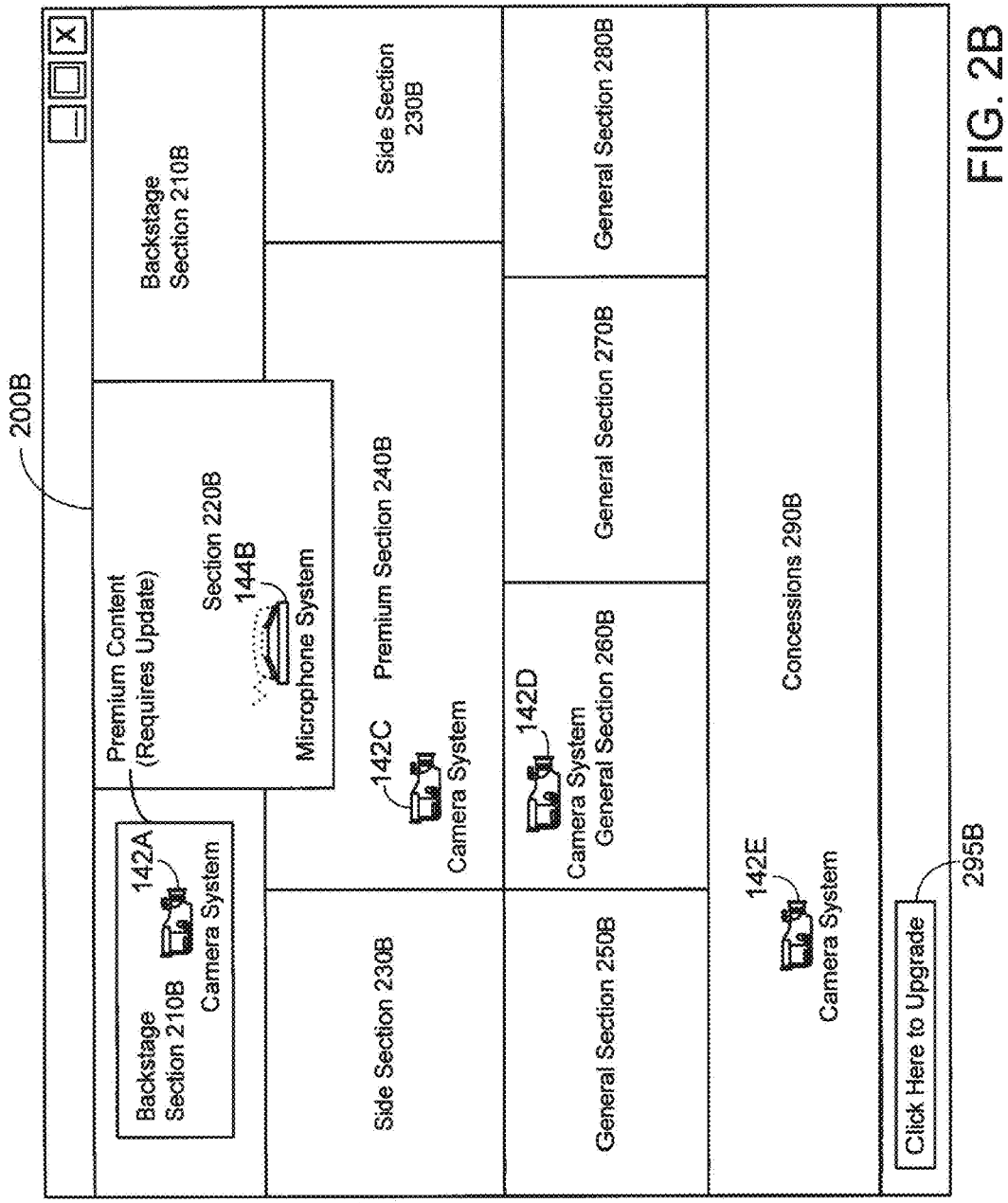
FIG. 2B is an exemplary user interface representing the physical orientation and showing the user where sensors are located.

Referring to FIG. 2A, a venue topology 200A is shown illustrating how an entertainment venue (e.g., a concert site) may be configured to support a panoramic entertainment experience. For convenience, particular components and messaging formats described earlier are referenced. However, similar methodologies may be applied in other implementations where different components are used to define the structure of the system, or where the functionality is distributed differently among the components shown. Although FIG. 2A represents a topology, FIG. 2A also may be presented in a graphical user interface (e.g., through a web browser), which is shown in FIG. 2B.

Venue topology 200A includes backstage section 210A, a stage section 220A, side sections 230A, premium section 240A, general sections 250A, 260A, and 280A, and concessions 290A. While different topologies may change depending on the configuration of an entertainment event or venue, the venue topology 200A illustrates an exemplary configuration for organizing a venue topology. In particular, venue topology 200A illustrates how a location label for a sensor may be identified based on its function (e.g., concessions, stage). Other venue topologies may use a uniform grid system, a seating chart, a functional chart, other system, or a combination of one or more of the aforementioned examples.

Generally, backstage sections 210A describe one or more locations in a venue topology 200A that are used to support the performance on stage 220A. Backstage sections 210A may include offices where interviews are conducted, one or more dressing rooms, and/or facilities used by performers and/or technical crews in support of the performance on stage 220A. Although backstage 210A is shown as being located off of the stage 220A, one or more portions of backstage 210A may be located in alternate locations. For example, an alternate venue topology may include a sound booth located above crowd 260 as a backstage 210A.

In venue topology 200A, there is a camera system 142A in the backstage area. In one example, camera system 142A is a helmet-mounted camera system with a GPS receiver attached to a band manager. Thus, premium subscribers could view how a band manager controls a concert.

Generally, the stage section 220A includes one or more areas where an entertainer performs. The stage 220A could include a theater stage, an orchestra pit, in addition to the aisles where entertainers sometimes venture. The stage section 220A includes a microphone system 144B enabling distribution of an audio signal(s) received on the stage section 220A.

Venue topology 200A includes numerous sections where an audience may reside. For example, venue topology 200A includes side sections 230A, premium section 240A, and general sections 250A, 260A, 270A, and 280A. Premium section 240A includes a camera system 142C, which may require a user to purchase or receive a special level of access in order to receive the stream from the premium section 240A. General section 260A includes a camera system 142D that provides a video stream from a perspective further back from the stage 220A.

Concessions 290A is an example of an auxiliary facility or service in the venue topology 200A that is not directed perceiving the stage 220A. While the exact functionality of the auxiliary facility or service may change with a particular venue, the entertainment provider may enable a user to receive streams related to peripheral events at an entertainment event (as is indicated by camera system 142E). For example, when the entertainment event includes a baseball game, the user may wish to receive video streams showing the crowd standing outside of the baseball stadium (e.g., Waveland Avenue in Chicago outside of Wrigley Field) eagerly awaiting or pursuing a home run (see e.g., FIG. 3A).

The subscription level and/or price may be modified when a user agrees to provide a sensor at an event or venue. For example, when a user agrees to provide a wireless camera at a parade or at another event later on, the price of the subscription may be reduced to provide incentives to consumers to provide sensors and allowing their sensors to be used at these events. Similarly, in addition to options allowing a user to operate user-owned sensors, a concert participant may agree to operate forum provided devices. Thus, a user may receive a ticket at a reduced price if the user agrees to operate a helmet-mounted camera during the event.

FIG. 2B is an exemplary graphical user interface 200B representing the physical orientation and showing the user where sensors are located. GUI 200B is similar to venue topology 200A in that a concert venue is depicted and different regions in the venue are shown. However, GUI 200B represents a user interface that may be displayed to a user while venue topology 200A represents. GUI 200B represents a display that may be generated to illustrate which sensors are available and where the sensors are with respect to a particular location.

Moreover, while GUI 200B is a user interface representing the venue topology shown in GUI 200A, GUI 200B includes some additional features. In particular, GUI 200B includes a field or bar in the upper right hand corner enabling a user to minimize, maximize, or quite the user interface application. GUI 200B also includes a premium display indicator around camera system 142A located in the backstage section 210B indicating that the camera 142A in the backstage section 210B is premium content requiring a premium subscription or a ticket before a user is allowed to receive content from the camera 142A. There is an upgrade interface 295B indicating that a user may click here to update.

Figure 2E:
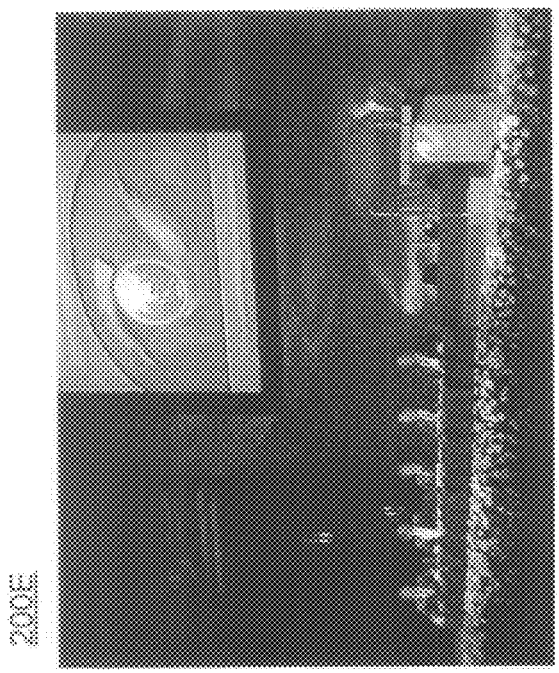
FIG. 2E is an exemplary view based on a combined view from two sensors.
Figure 2D:
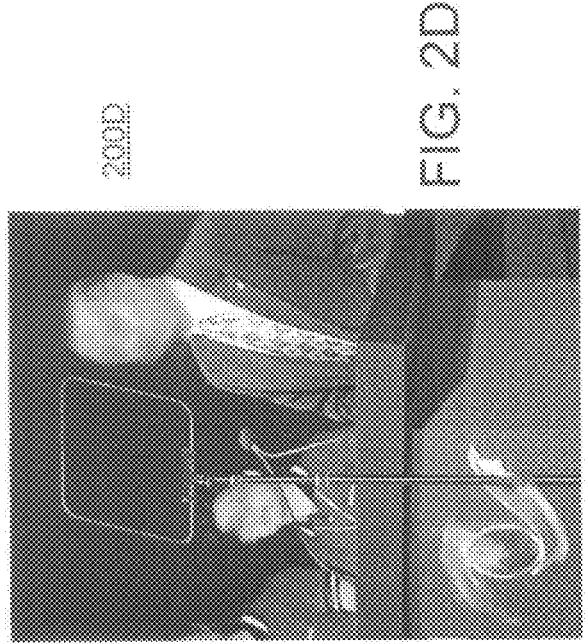
FIG. 2D is an exemplary view from one of the sensors if a corresponding portion of the FIG. 2B interface is selected.
Figure 2C:
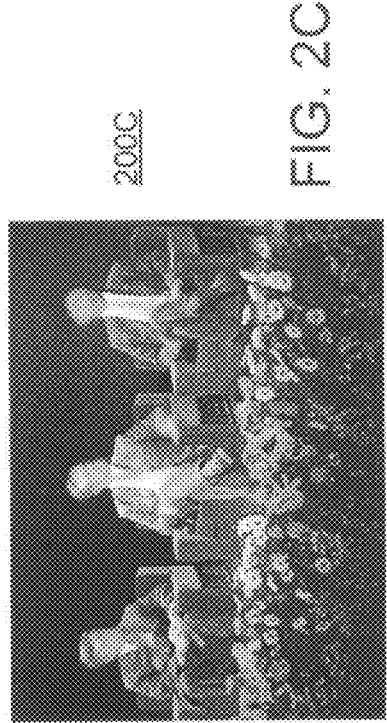
FIG. 2C is an exemplary view from one of the sensors if a corresponding portion of FIG. 2B is selected.

FIGS. 2C and 2D are exemplary views from sensors if a corresponding portion of FIG. 2B is selected. In particular, GUIs 200C and 200D each represent a difficult video feed that may be presented when an associated sensor (in this case a camera) from an event is selected. In this case, GUI 200C represents the view from camera system 142C in the premium section 240B while GUI 200D represents the view from the camera system 142D in the general section 260B.

The streams may be combined so as to simulate a stream of data from a location for which no sensor exists. For example, a user may elect to receive a video feed from a designated location where no camera is located. The host may combine the streams from cameras located on either side of the designated location and interpolate the images so as to present a simulated image.

FIG. 2E is an exemplary view shown in GUI 200E representing a simulated view that may be generated by combining content from multiple sensors. The GUI 200E represents a view that may be generated by combining data from two different sensors, which in FIG. 2E includes the views from GUI 200C and GUI 200D. Thus, the images from FIG. 2C (showing a seated panel), and FIG. 2D (showing a standing speaker) are combined with other data to generate a composite image of the stage that includes a standing speaker and a seated panel.

Using the location of the sensors and determining common information between the sensors, common data points may be established as a reference. By using the data that appears in either of the sensors in relation to the reference, the data used to generate the simulated view may be determined. Thus, a composite or simulated view an entertainer on stage may be generated by generating a series of images for the entertainer based on location. Data for values used in the simulated image may be generated by capturing data from one or more of the images and placing the captured data in the composite image using the reference.

A number of display formats may be used. For example, a single person may view a single or multiple displays. Multiple users may be routed to a common display provided for a group of users. For example, if a particular user with a helmet mounted camera provides a much sought after experience (due to his rhythmic head motions), the particular user's data may be distributed to multiple users.

A user may use an input mechanism to navigate through the experience. For example, a user may use a joystick or a track ball to navigate among sensors. By advancing a joystick forward, the user may be presenting images from a camera located in a forward direction. The forward direction may be absolute (e.g., relative to fixed reference such as the stage or true north), or the forward direction may be related to the present orientation of a camera. Where the forward direction is related to the present orientation, moving the joystick or control forward may find the next camera in that direction that is oriented so that a specified field of view is maintained or preserved in some regards. In one such example, moving the joystick forward locates the next sensor with an axis for a field of view within 30 degrees of the present axis for a field of view. As the user navigates towards an object of interest (e.g., the stage or the focus of a crowds attention), the field of view tolerance may vary to accommodate the different orientation of cameras that are located closer to the object of interest. For example, when a user begins a concert experience at the rear of a concert hall, the user may pursue a view closer to the action. In pursuing closer sensors, the user may be presented with a series of incremental feeds that present the appearance of moving incrementally closer to the stage. The greater the forward control input, the greater the incremental movement. When a user is close to the stage, the field of view may be orthogonal to the field of view from the rear of the concert. In this circumstance, the field of view tolerances may be modified or waived altogether to provide the closest view.

Figure 3A:
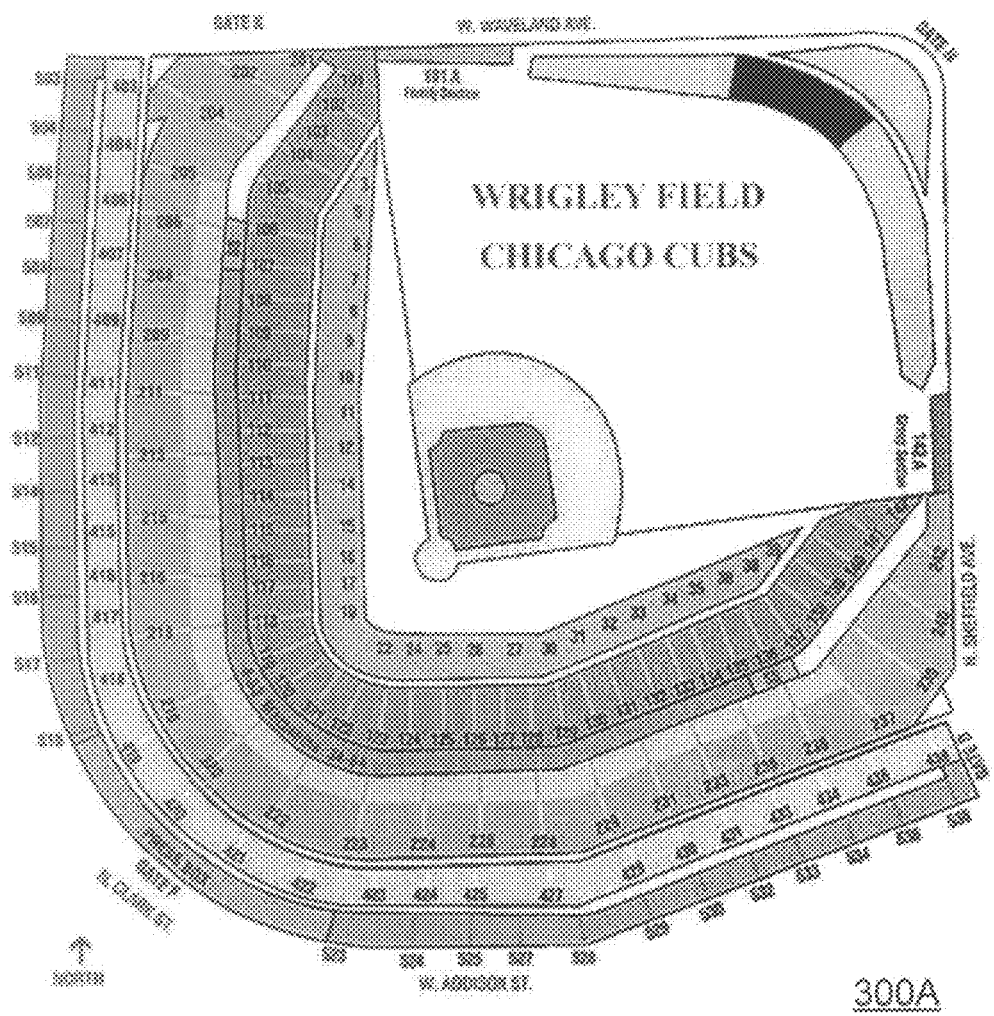
FIGS. 3A and 3B are an exemplary map of a baseball stadium and exemplary views from the baseball stadium, respectively.
Figure 3B:
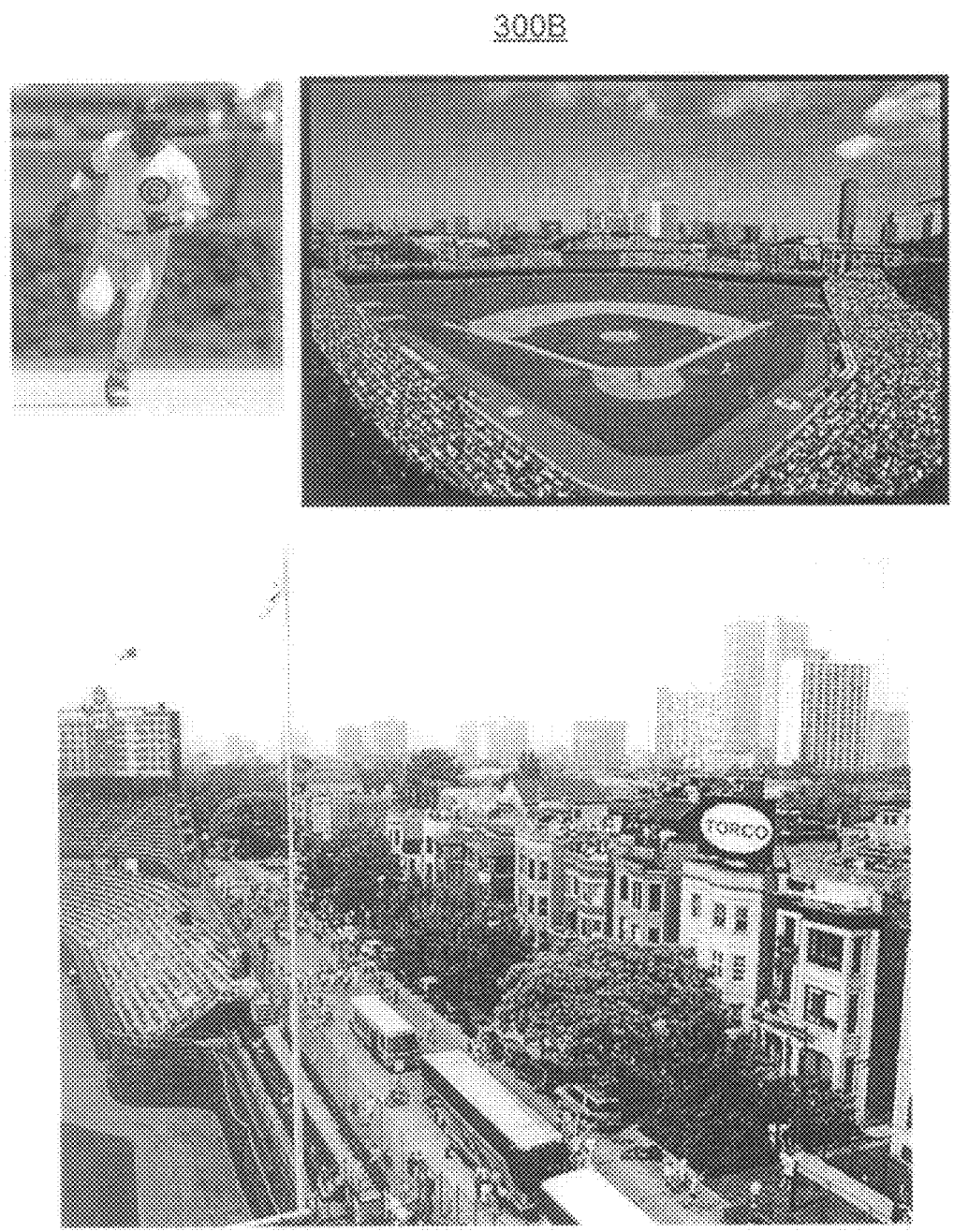

FIGS. 3A and 3B are an exemplary map of a baseball stadium and exemplary views from the baseball stadium, respectively. In particular, GUI 300A shows a map of a baseball stadium. FIG. 3B shows different views from in GUI 300B that shows the view on the field, outside of the ballpark, and from the stands respectively. Although imagery data is shown, the sensors could include microphones that capture and provide audio from those locations.

In one implementation, all three images are displayed simultaneously. In another implementation, a host may cycle through the different displays. Still another implementation may allow the user to select among available sensors for the display. Although a baseball stadium is shown, other sporting events may be supported such as football, golf, automobile racing (e.g., NASCAR), hockey, soccer, a marathon race, and lacrosse.

The venue may relate to a dynamic or impromptu event such as a traffic conditions, a parade, a sporting event, a concert, a NASCAR race, a marathon, or a rally.

Figure 3C:
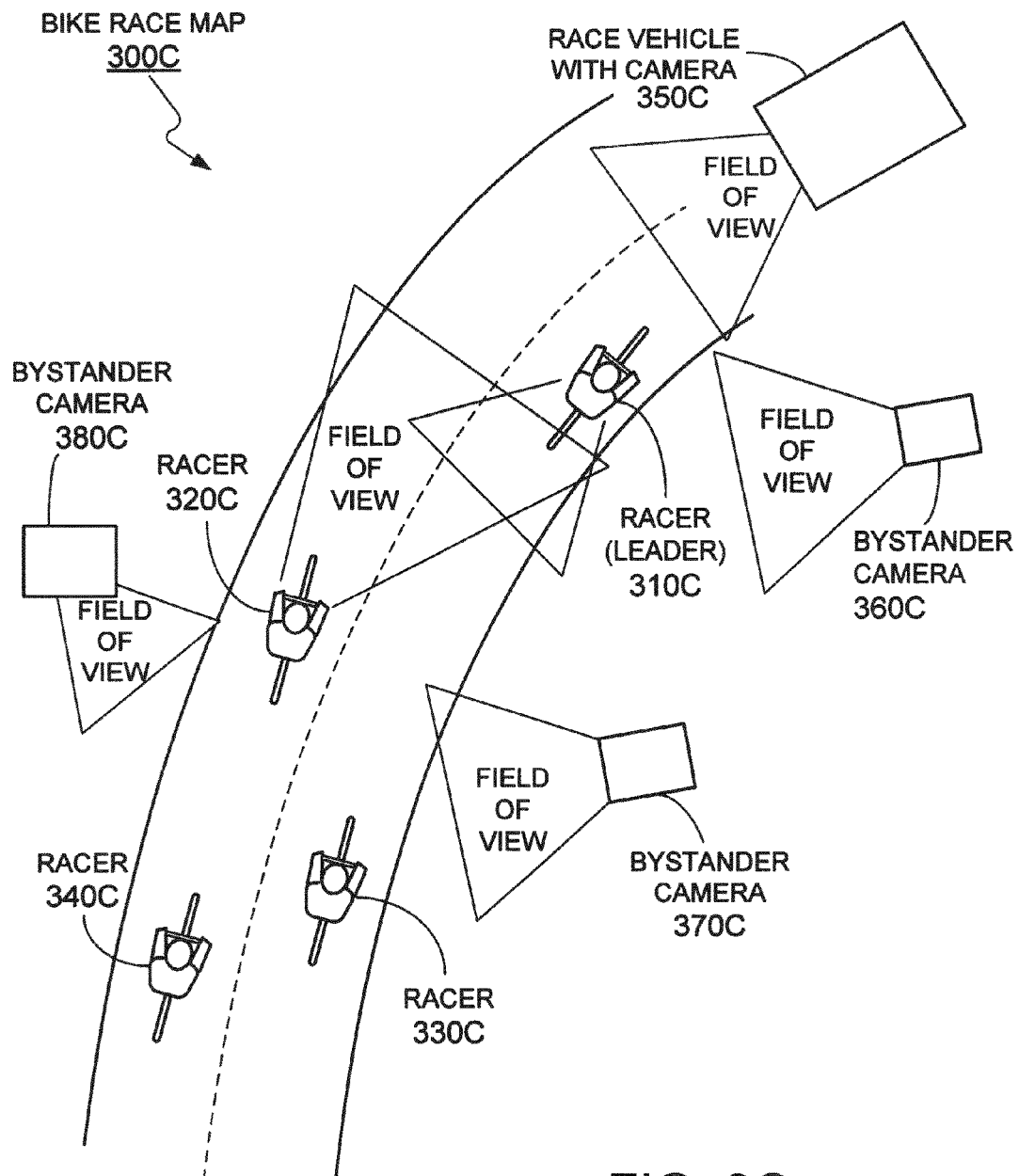
FIGS. 3C and 3D are an exemplary map/user interface of a bicycle racing event and an exemplary view from the bicycle racing event, respectively.
Figure 3D:
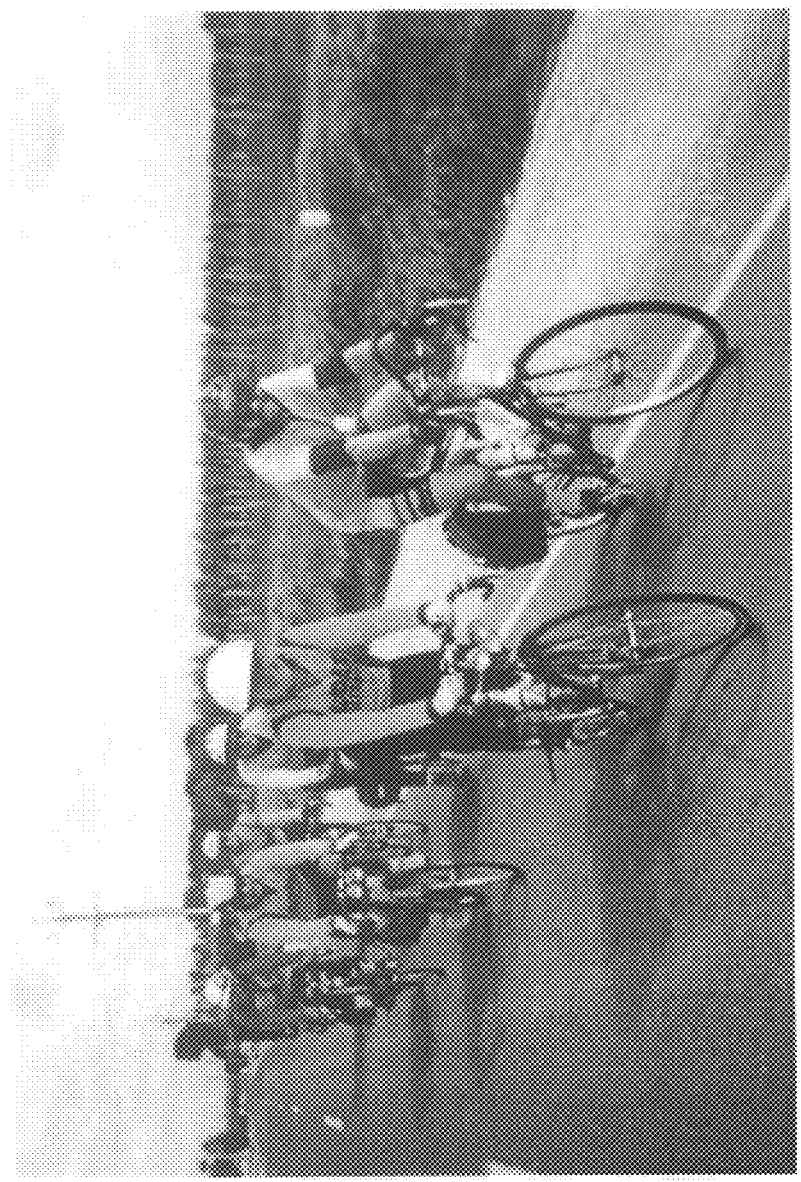

FIGS. 3C and 3D are an exemplary map of a bicycle racing event and an exemplary view from the bicycle racing event, respectively. FIG. 3C is a bicycle race map 300C that depicts a race leader 310C, racers 320C, 330C, and 340C, race vehicle 350C, and bystanders 360C, 370C, and 380C. The race leader 310C is shown with a camera configured to capture a field of view to the rear of the leader (towards the peleton with racers 320C, 330C, and 330C). Racer 320C has a camera with a field of view towards the race leader 310C. Race vehicle 350C has a camera with a field of view towards the race leader 310C, and the peleton. Bystander 360C has a field of view capturing the race leader 310C, while bystanders 370C and 380C are have a field of view that captures the peleton. Similar to FIGS. 2A and 2B, FIG. 3C may represent both a venue topology and a map for a venue lacking a fixed physical structure. Instead, however, a panoramic experience for an event may simply detect mobile devices as they become available and incorporate the sensor feeds into the presentation. In this manner, the sensors may be configured in advanced or registered with a wireless carrier or a service provider. Regardless of whether advanced registration systems are used, the sensors that are along a race (e.g., the Tour de France) may be dynamically incorporated and removed from the list of sensors that are available.

A multidimensional control system may be used to control a user's view. A first control may be used to select the location of the sensors sought while a second control is used to select the field of view from a location. Thus, when tracking a bicycle race and a racer in particular, an initial view of interest related to a racer in the pack (peleton) is generally towards the race leader. However, if the racer attempts to challenge and/or becomes the leader, other views of interest may include a backwards view. Thus, a user may select a view that stays with race but looks backwards. The user controls may allow a user to move the overall location forward using a first control (e.g., moving a first joystick forward) while moving a second control backwards (e.g., moving a second joystick backwards) to provide a rear view from the location. These controls may generate metadata search criteria to provide the requisite views.

The bicycle race also illustrates how a subject of interest may be moving and the venue moves with a subject of interest. A host may process the metadata from the race sensors (e.g., residing on the competitors and among the fans) so as to provide a 'good' experience where requiring a user to select from among the sensors is difficult, as the sensor providing the content of interest may be constantly changing, particularly where a bystander's camera only provides content of interest for a brief duration in a longer event. Thus, a host may allow an editor to edit the entertainment experience, and produce an event for a user. Alternatively, a host may edit and present the entertainment experience in such a manner so as to allow a user to follow a racer of interest, or to allow the user to 'move' among the peleton. Similarly, a user may be allowed to stay with a moving subject (e.g., a racer) by coordinating the switching of sensors from bystanders. The sensor switch may be coordinated by using the metadata to find the next feed that is capturing the requisite subject matter.

Figure 3E:
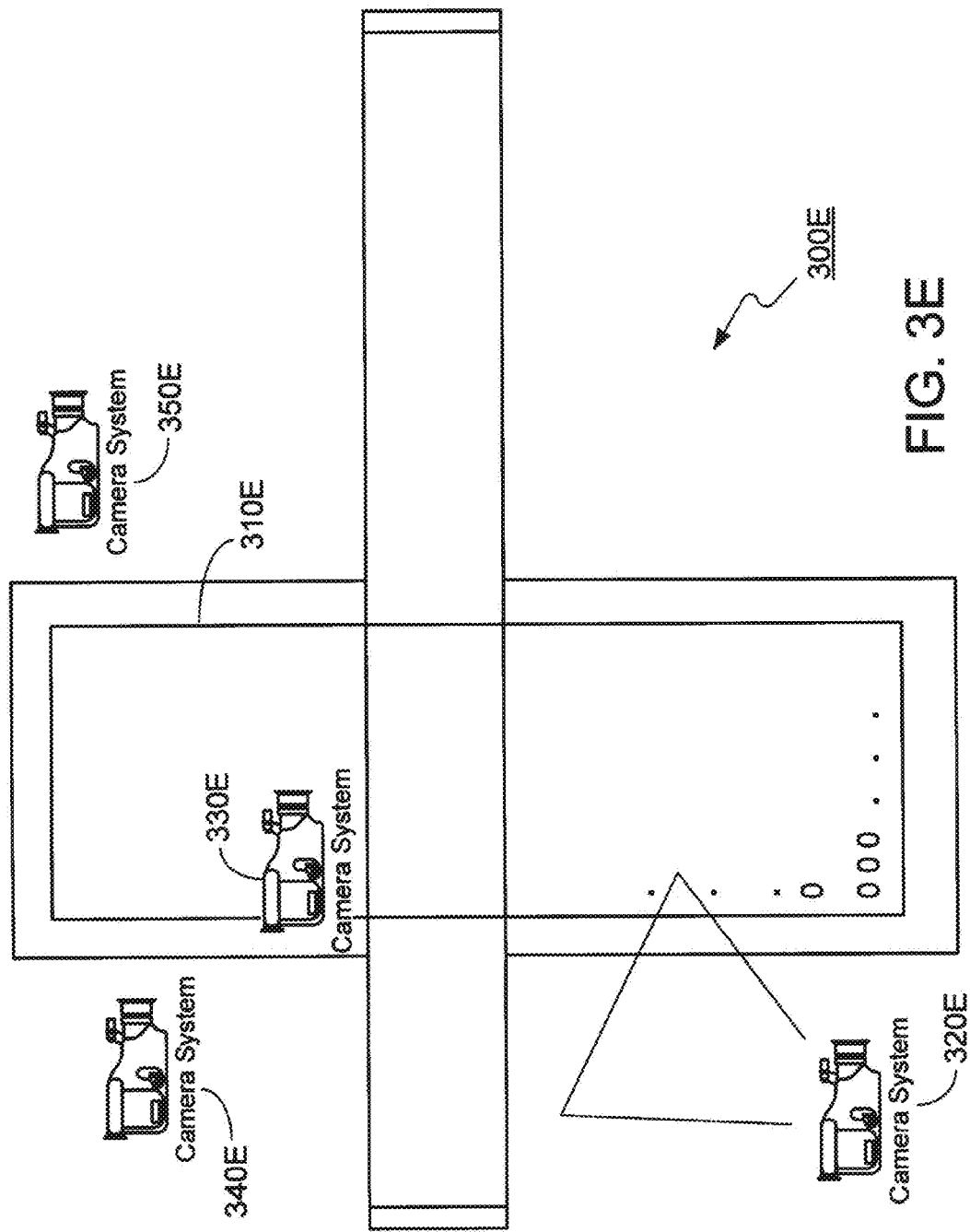
FIGS. 3E and 3F are an exemplary map of a parade and an exemplary view from the parade respectively.
Figure 3F:
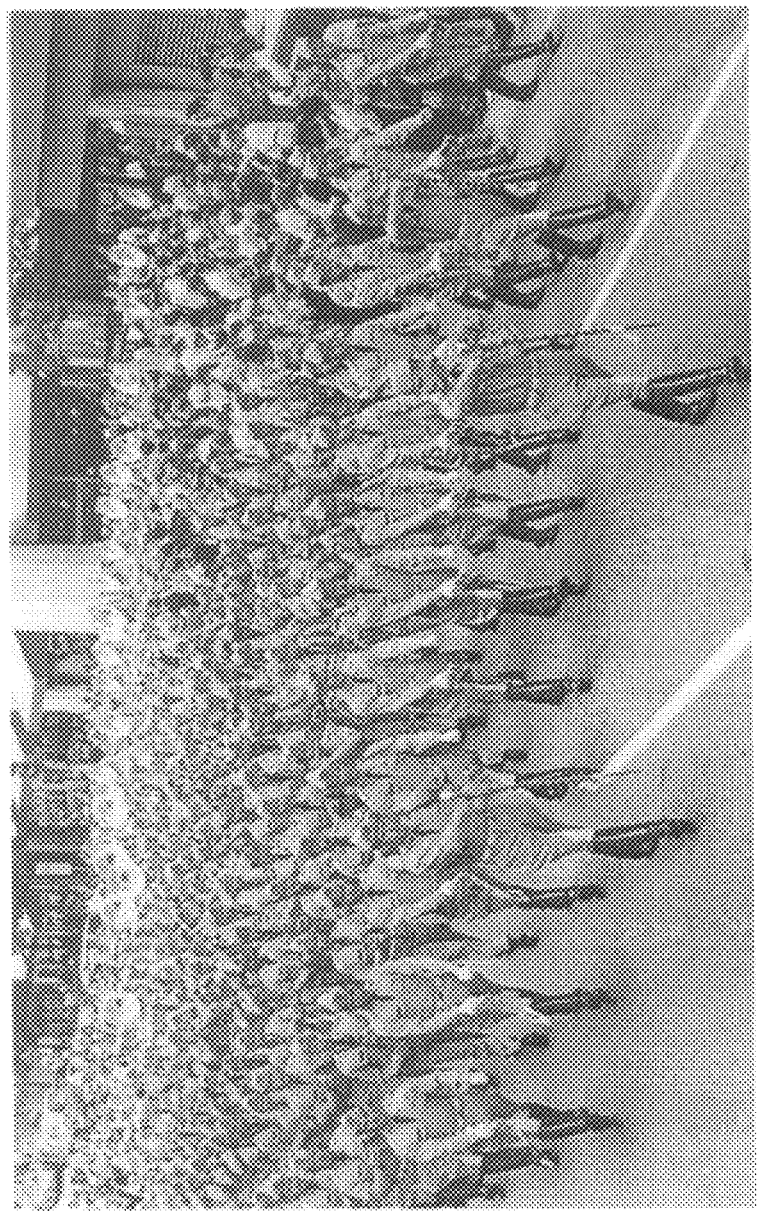

FIGS. 3E and 3F are an exemplary map of a parade and an exemplary view from the parade, respectively. In particular, FIG. 3E shows a street saturated with cameras that may be used to capture the parade. One of the sensors may be used to provide the view shown in FIG. 3F. FIG. 3E is a map showing a marching band 310E, a camera systems 320E, 330E (actually located in the marching band), 340E, and 350E. Camera System 320E has been selected to present the view shown in GUI 300F in FIG. 3E.

Figure 4A:
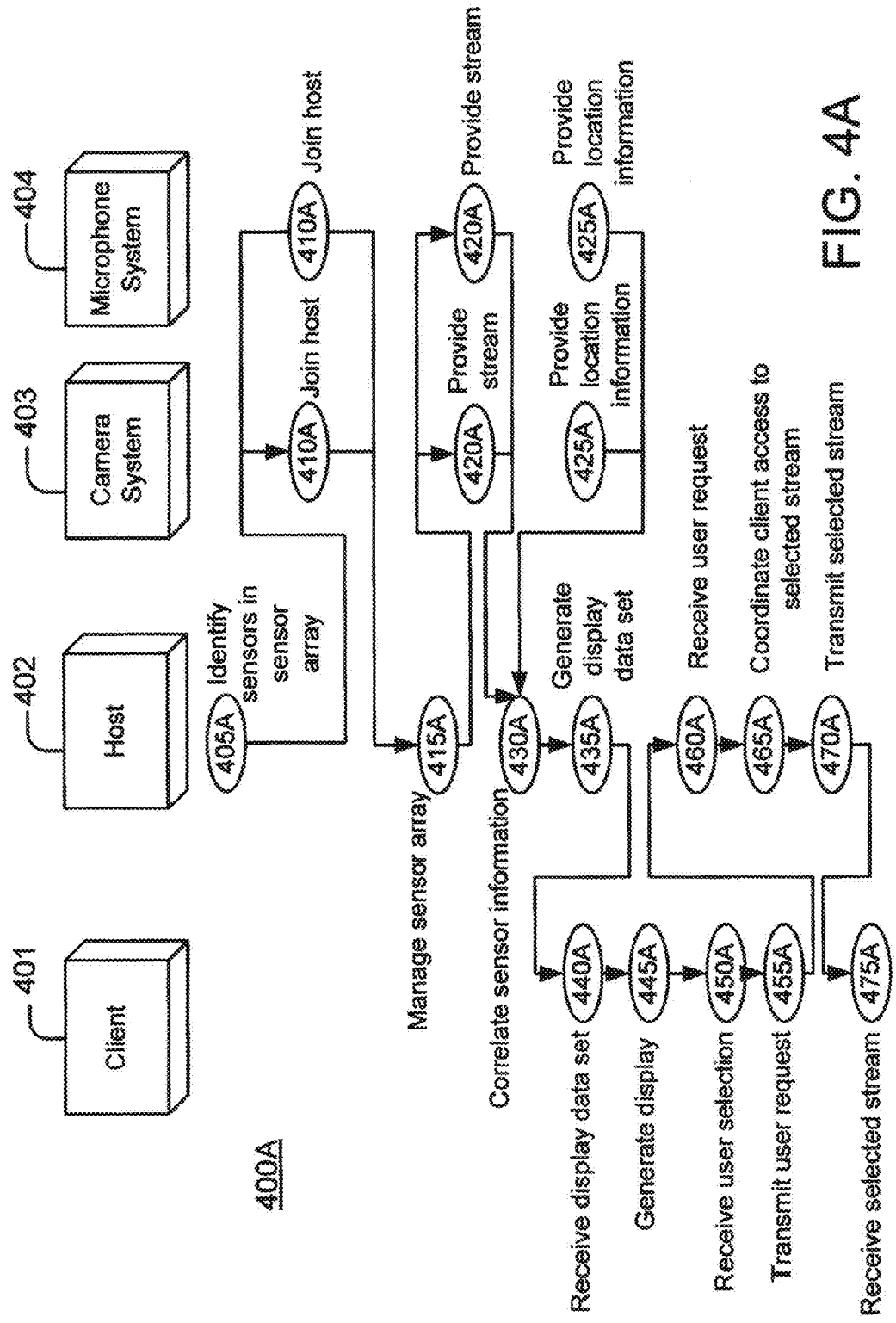
FIG. 4A is a flow chart of an exemplary process by which a client may participate in an entertainment event by accessing a host.

Referring to FIG. 4A, a flow chart 400 illustrates how a client 401 may participate in an entertainment event by accessing host 402. For convenience, particular components and messaging formats described earlier are referenced as performing the process. However, similar methodologies may be applied in other implementations where different components are used to define the structure of the system, or where the functionality is distributed differently among the components shown.

Initially, the host 402 interfaces with the sensor array of more than one sensor. This is done by identifying sensors in the sensor array (405A). With the sensors identified, camera system 403 and microphone system 404 join the host (410A). For example, the camera system 403 and microphone system 404 may use a wireless communications interface to register with a wireless access point at the concert site (not shown). The wireless access point may include a management agent for a concert site that provides reference information (e.g., IP ("Internet Protocol") addresses) to the camera system 403 and microphone system 404. The camera system 403 and microphone system 404 may use reference information to request to connect with the distribution system 130 that will coordinate the distribution of the streams of data units provided by the camera system 142 and the microphone system 144 to host 404.

The host 404 manages the sensor array (415A). Managing the sensor array may include receiving the streams of data units provided by sensors in the sensor array, and forwarding them to a duplicating switch so that one or more clients may access the duplicating switch to receive the stream of interest.

The camera system 403 and the microphone system 404 may provide a stream to the host 404 (420A). For example, the camera system 403 may provide a video signal of a participant in a concert crowd wearing a helmet-mounted camera, while the microphone 404 may provide the audio signal recorded on stage. Similarly, the camera system 403 and the microphone system 404 provide location information (425A). In one example, the camera system 403 and the microphone system use a GPS receiver to determine location information, and use a communications interface to provide the GPS coordinates for the sensor providing the stream. In another example, providing the location information may include determining a seat location for a concertgoer and using the seat location as the location information. Other location information that may be used includes, but is not limited to, other inertial navigation systems (e.g., an automated gyroscope), or a local beacon providing a location signal enabling a sensor to determine a location relative to the location of the beacon. Alternatively, a sensor may be registered operate in a particular location. For example, a fixed camera system may be registered as located on a street outside of a baseball park.

Regardless of the content provided by the sensor or how the location information is determined, the host 402 associates location information with a stream of data units (430A). With the sensor information and the location associated, the host 402 enables a user to perceive a map related to an entertainment event or venue (435A). Enabling a user to perceive a map related to an entertainment event or venue may include creating a web page that shows a venue topology with icons representing sensors superimposed over the topology. The web page may allow a user to select one of the icons to retrieve the stream associated with the selected sensor system represented by the selected icon. For example, the icon may represent a URL ("Uniform Resource Locator") associated with a stream of data units being duplicated by a duplicating switch 134.

The client 401 receives the display data set (440A), and generates a display (445A). For example, the client 401 may use a web browser to describe a venue topology for a concert of interest, which may or may not identify the location or type of sensors that make data available. The client 401 then receives a user selection (450A). For example, the user may 'click' on an icon appearing in a web page representing a camera system whose stream of data units the user elects to receive. The client transmits the user request (455A).

The client 401 receives the user request (460A), and coordinates client access to the requested stream (465A). For example, the host 402 may queue up a stream for a selected sensor so that a server or duplicating switch 134 transmits the stream to the client 401. In another example, coordinating client access to the selected stream includes adding an IP address for a client 401 to a list of IP addresses to which a duplicating switch 134 is transmitting the selected stream.

The host 402 transmits the selected stream to the client 401 (470A), which in turn, receives the selected stream (475A).

Figure 4B:
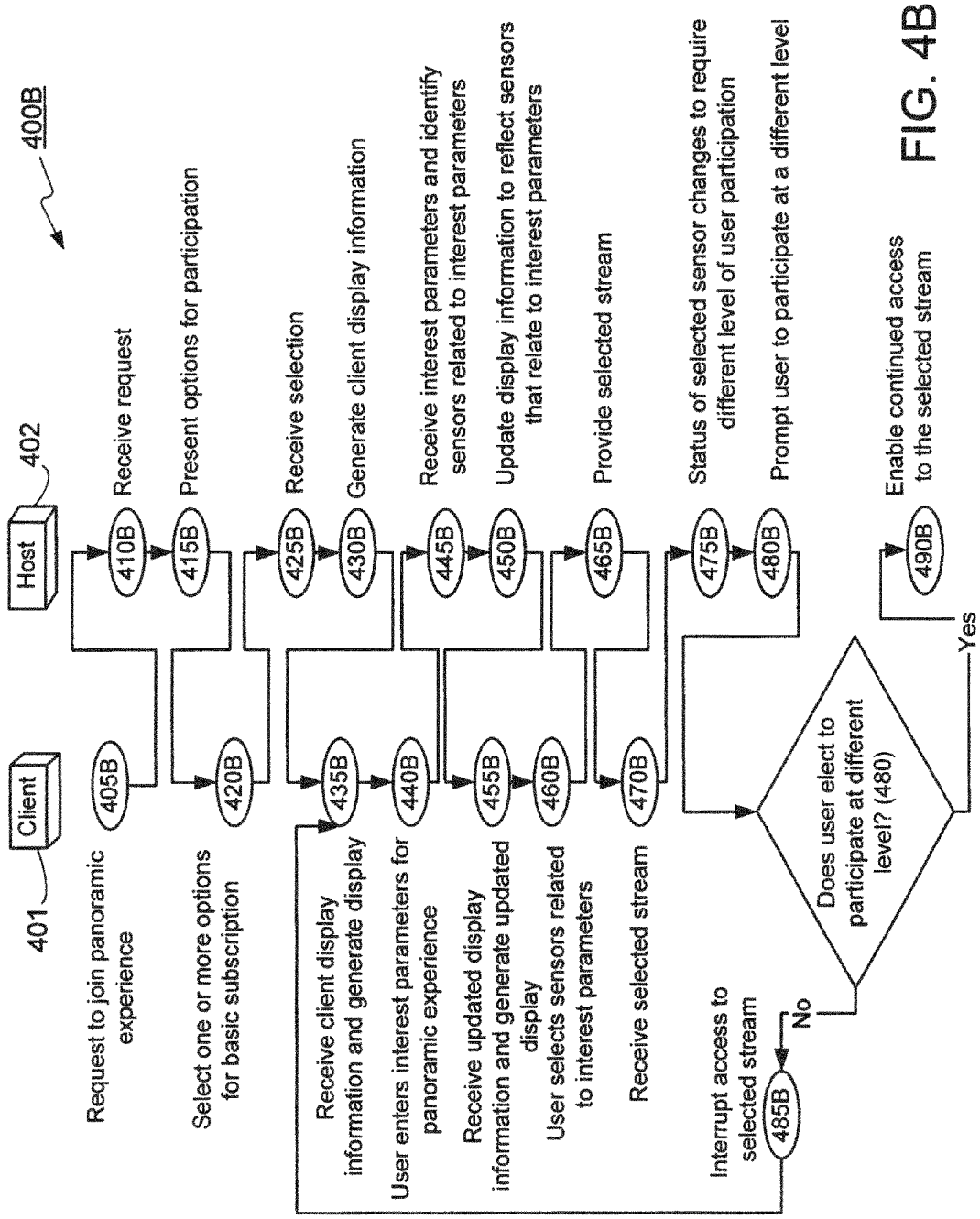
FIG. 4B is a flow chart of an exemplary process by which a client may participate in a panoramic experience with more than one level of access.

Referring to FIG. 4B, a flow chart 400B illustrates how the client 401 may participate in a panoramic experience with more than one level of access. For convenience, particular components and messaging formats described earlier are referenced as performing the process. However, similar methodologies may be applied in other implementations where different components are used to define the structure of the system, or where the functionality is distributed differently among the components shown.

Initially, a client 401 requests to join a panoramic experience (405B). This may include accessing a web site or launching a media application enabling access to an entertainment event. The host 402 receives the request (410B), and presents options for participation (415B). For example, the host 402 may prepare a display enabling the user to select behind-the-scenes access (e.g., to backstage 210, or a premium section 240). The display also may allow the user to enter financial information, such as a credit card, to participate in the panoramic experience.

The client 401 selects one or more options for participation (420B). In the flow chart 400, the client selects to participate at a basic subscription. The host 402 receives the selection (425B), and generates client display information related to the basic subscription (430B).

The client 401 receives display information and generates a display (435B). The user enters interest parameters for their panoramic experience (440B). For example, the user may search for a helmet-mounted camera for an attendant in the concert experience whose demographic profile matches interests sought by the user. Alternatively, the client 401 may generate a query seeking a particular venue (e.g., a street name outside of a baseball stadium when the entertainment experience includes the baseball game).

The host 402 receives the interest parameters and identifies sensors related to the interest parameters (445B). The host 402 updates the display information to reflect sensors that relate to the interest parameters (450B). For example, when the user requests the street name outside of a baseball stadium, the display information may be updated to show the location of one or more camera systems located on the street of interest. The client 401 receives the updated display information and generates an updated display (455B). The user then selects sensors related to the interest parameters (460B). The host 402 provides the selected stream (465B) to the client 401, which in turn receives the selected stream (470B).

At a subsequent time, the status of the selected sensor changes to require a different level of user participation (475B). For example, a helmet-mounted camera system at a baseball game may be entering a team clubhouse. Accessing a stream in the team clubhouse may require a premium subscription, which is not allowed for with the permission level associated with the user. When the distribution system 130 determines that a particular data stream of data units has acquired a premium status, access to the feed may be scrutinized on an automated manner so that only clients with the requisite authorization are allowed to access or maintain access to the premium stream. Accordingly, the host 402 may prompt the client 401 to participate at a different level (480B). If the user elects to participate at a different level, the host 402 enables continued access to the selected stream (490B). If not, access to the selected stream is interrupted (485B). The client 401 then may generate a display enabling the user to select sensors operating at their approved level.

FIG. 4C is an exemplary user interface that may be used to shelter a child from inappropriate content or showing available sensors for a nonpremium user. Image 410C may represent an unfiltered image from a camera located in the parking lot of a rock concert. In particular, image 410C shows a shirtless gentleman standing on the roof of a car in a parking lot with a beverage in his arms. Image 410C may be identified as a disturbing image for a younger audience, and thus, the image 420C may be presented to that shows an image from the same sensor modified so that the gentleman has been blurred out. Other filtering techniques may include using a black box over the image, generating a series of square pixels over the image, of blocking the image altogether. Although the blurring 420C was described with respect to a parental control operation, other images may be blocked or blurred to encourage a user to become a premium subscriber. Becoming a premium subscriber may allow the user to receive the image without the blurring function.

Other implementations are within the scope of the following claims. For example the client may retrieve a selected stream directly from a selected sensor, rather than using an intermediary such as the host 402 to enable access to the selected stream.

An event (e.g., entertainment experience) may be saturated with sensors. A client then may present a panoramic experience (such as walking through a crowd) by switching in succession between neighboring sensors. Alternatively, the client may present a panoramic display of an instance in time by switching between one instance (e.g., frame) in each of several related streams of interest. For example, if a major league baseball player were to establish a new home run record, a user may receive a sequence of images that rotate around the major league player as the baseball is hit.

The entertainment experience may be used to drive a high-end entertainment system such as a home theater surround sound system. The host 402 may be used to identify one or more sources of sound, where each of the sources is used as a channel in the home theater surround system. Thus, in a baseball example, microphones located on a batter, a catcher, an umpire, and home plate may be used to provide an audio signal(s) for the front speakers. Microphones located on the pitcher and the outfield may be used to drive the rear channels. Microphones located in the dugouts and on the first and third bases may be mixed into the side channel. The channels need not relate to one sensor. For example, the dugout and third base microphones may be mixed to drive a side channel in the home theater system. Alternatively, an ambient crowd signal may be generated from different microphones in the baseball stadium seating and mixed in with other audio signals to provide ambient crowd noise. The user may reconfigure their home theater system. For example, a user may prefer to simulate the stadium experience from a seat behind home plate rather than the stadium experience from the baseball field. Accordingly, the audio signals may be mixed so that the microphones on the baseball field provide the front channels, and the audio signals from the crowd provide the rear channels.

The sensor data may be stored and made available as an on-demand experience. A user may relive a sporting event, or a portion of a sporting event (e.g., a key play) from a different perspective. For example, a user may experience a baseball game, and a double play in particular from the perspective of the different participants and perspectives in the baseball game.

What is claimed is:

1. A method of presenting a multimedia experience to a user from across the Internet for an event, the method comprising:
   dynamically registering two or more mobile video camera units with a sensor array server, wherein each of the video camera units is configured to provide dynamic location information for an attached video camera, wherein the dynamic location information for the attached video camera changes as the attached video camera is moved during the event;

generating, based on the location of the two or more mobile video camera units, a topology for the event, wherein the topology provides a model for the event in which the video camera moves within the event;

relating the dynamic location information for the event with the topology to identify a relative location of each of the two or more mobile video camera units;

generating a map based on the topology that reflects the dynamic location information of the video cameras in the topology; and enabling the user to interact with the map so that the user can navigate from a first camera in the video cameras to a second camera in the video cameras to change the perspective that the user perceives in viewing the event by selecting an icon for a selected unit of the two or more mobile video camera units.

2. The method of claim 1 wherein dynamically registering the two or more mobile video camera units with the sensor array server includes enabling a mobile phone to register with a server in order to stream video content from a mobile phone to the sensor array server.

3. The method of claim 1 wherein generating, based on the location of the two or more mobile video camera units, the topology for the event includes generating a list of mobile devices associated with a geographic area.

4. The method of claim 1 wherein generating, based on the location of the two or more mobile video camera units, the topology for the event includes generating a list of mobile devices associated with a desired perspective.

5. The method of claim 1 wherein relating the dynamic location information for the event with the topology to identify a relative location of each of the two or more mobile video camera units includes providing an indication of whether a first unit in the two or more mobile video camera units is closer to a known reference point than a different unit in the two or more mobile video camera units.

6. The method of claim 1 wherein generating a map based on the topology includes generating a dynamic map that reflects real-time location of at least unit in the two or more mobile video camera units.

7. The method of claim 1 wherein generating a map based on the topology includes generating a periodically-updated map that reflects real-time location of at least unit in the two or more mobile video camera units.

8. The method of claim 1 wherein enabling the user to interact with the map includes enabling the user to employ a mobile device to interact with the map.

9. The method of claim 1 wherein enabling the user to interact with the map includes enabling the user to employ a mobile device to interact with the map in order to route content to an entertainment system.

10. The method of claim 1 wherein enabling the user to interact with the map to select the icon for a selected unit of the two or more mobile video camera units includes rendering content within an Hyper Text Markup Language (HTML) web page.

11. A system configured to present a multimedia experience to a user from across the Internet for an event, the system comprising a processor configured to perform operations that include:

dynamically registering two or more mobile video camera units with a sensor array server, wherein each of the video camera units is configured to provide dynamic location information for an attached video camera, wherein the dynamic location information for the attached video camera changes as the attached video camera is moved during the event;

generating, based on the location of the two or more mobile video camera units, a topology for the event, wherein the topology provides a model for the event in which the video camera moves within the event;

relating the dynamic location information for the event with the topology to identify a relative location of each of the two or more mobile video camera units;

generating a map based on the topology that reflects the dynamic location information of the video cameras in the topology; and enabling the user to interact with the map so that the user can navigate from a first camera in the video cameras to a second camera in the video cameras to change the perspective that the user perceives in viewing the event by selecting an icon for a selected unit of the two or more mobile video camera units.

12. The system of claim 11 wherein dynamically registering the two or more mobile video camera units with the sensor array server includes enabling a mobile phone to register with a server in order to stream video content from a mobile phone to the sensor array server.

13. The system of claim 11 wherein generating, based on the location of the two or more mobile video camera units, the topology for the event includes generating a list of mobile devices associated with a geographic area.

14. The system of claim 11 wherein generating, based on the location of the two or more mobile video camera units, the topology for the event includes generating a list of mobile devices associated with a desired perspective.

15. The system of claim 11 wherein relating the dynamic location information for the event with the topology to identify a relative location of each of the two or more mobile video camera units includes providing an indication of whether a first unit in the two or more mobile video camera units is closer to a known reference point than a different unit in the two or more mobile video camera units.

16. The system of claim 11 wherein generating a map based on the topology includes generating a dynamic map that reflects real-time location of at least unit in the two or more mobile video camera units.

17. The system of claim 11 wherein generating a map based on the topology includes generating a periodically-updated map that reflects real-time location of at least unit in the two or more mobile video camera units.

18. The system of claim 11 wherein enabling the user to interact with the map includes enabling the user to employ a mobile device to interact with the map.

19. The system of claim 11 wherein enabling the user to interact with the map includes enabling the user to employ a mobile device to interact with the map in order to route content to an entertainment system.

20. The system of claim 11 wherein enabling the user to interact with the map to select the icon for a selected unit of the two or more mobile video camera units includes rendering content within an Hyper Text Markup Language (HTML) web page.

* * * * *